United States Patent

Granel et al.

[11] Patent Number: 5,869,583
[45] Date of Patent: Feb. 9, 1999

[54] PROCESS FOR THE CONTROLLED POLYMERIZATION OR COPOLYMERIZATION OF (METH)ACRYLIC AND VINYL MONOMERS AND PRODUCTS THUS OBTAINED

[75] Inventors: Claude Granel, Palaiseau; Philippe Teyssie, Neuville-En-Condroz; Robert Jerome, Tilff; Pascal Nicol, Pau, all of France

[73] Assignee: Elf Atochem S.A., France

[21] Appl. No.: 821,873

[22] Filed: Mar. 21, 1997

[30] Foreign Application Priority Data

Mar. 21, 1996 [FR] France .................................. 96.03536

[51] Int. Cl.⁶ ............................... C08F 2/00; C08F 4/00; C08F 210/00
[52] U.S. Cl. ........................... 526/72; 526/120; 526/147; 526/327; 526/329.3; 526/329.4; 526/329.7; 526/348; 526/348.7
[58] Field of Search ..................................... 526/147, 120, 526/72, 327, 329.3, 329.4, 329.7, 348.7, 348

[56] References Cited

U.S. PATENT DOCUMENTS 4,680,352  7/1987  Janowicz et al. ........................ 526/147
5,166,286  11/1992  Bender et al. ........................ 526/348.7

FOREIGN PATENT DOCUMENTS 0 735 052  10/1996  European Pat. Off. .

OTHER PUBLICATIONS

Grove et al., "The homogeneously catalysed addition reaction of polyhalogenoalkanes to olefins by divalent arylnickel complexes: comparative reactivity and some important mechanistic leads", *J. Organometallic Chemistry*, 372:C1–C6, 1989.

*Primary Examiner*—P. Hampton-Hightower
*Attorney, Agent, or Firm*—Millen, White, Zelano & Branigan, P.C.

[57] ABSTRACT

The process for the controlled radical (co)polymerization of (meth)acrylic and/or vinyl monomers is characterized in that the bulk, solution, emulsion or suspension polymerization or copolymerization is carried out, at a temperature at which can fall to 0° C., of at least one of the said monomers in the presence of an initiating system comprising a radical-generating compound and at least one catalyst composed of a metal complex containing a ligand of the type $$[4\text{-}R^3\text{-}2,6\text{-}(CH_2NR^1R^2)_2C_6H_2]^- \quad (I)$$

in which: $R^1$ and $R^2$, which are identical or different, represent a branched or unbranched $C_1$–$C_4$ alkyl group or a phenyl group or alternatively $R^1$ and $R^2$ form, with the nitrogen atom to which they are connected, a cyclic amine or alternatively the two $R^2$ groups, taken together, form a polymethylene bridge and $R^3$ represents a hydrogen atom, an alkyl or benzyl group or an electron-donating or electron-withdrawing functional group.

34 Claims, No Drawings

PROCESS FOR THE CONTROLLED POLYMERIZATION OR COPOLYMERIZATION OF (METH)ACRYLIC AND VINYL MONOMERS AND PRODUCTS THUS OBTAINED

BACKGROUND OF THE INVENTION

The present invention relates to a process for the controlled radical polymerization or copolymerization of (meth) acrylic and/or vinyl (for example vinylaromatic) monomers and to the polymers or copolymers thus obtained.

Radical polymerization is industrially one of the most widely used polymerization processes because of the variety of the monomers which can be polymerized, because of the ease of implementation and because of the synthetic processes used (emulsion, suspension, bulk or solution). However, it is difficult in conventional radical polymerization to control the size of the polymer chains and the distribution of the molecular masses. The polymers thus prepared contain chains of very high and very low masses (broad polydispersity), which results in materials with uncontrolled properties. Moreover, the sequential addition of monomer results in a mixture of homopolymers.

Anionic and cationic polymerization techniques, for their part, make possible correct control of the process, but the reaction conditions which these polymerization methods require are not always realizable on an industrial scale. Moreover, many monomers cannot be polymerized by these techniques.

Although there currently exist a few examples of controlled radical polymerization of (meth)acrylic or vinylaromatic monomers, using in particular CuCl/2,2'-bipyridine and RuCl$_2$(PPh$_3$)$_3$ (P=phosphorus and Ph=phenyl) complexes, these catalytic systems have only proved to be active in polymerization at temperatures greater than 100° C., in the absence of activators. Now, when the temperature is high, thermal self-initiation takes place, which results in particular in a decrease in the control of the polymerization.

In addition, for emulsion or suspension polymerization, it is known that the majority of the processes are implemented in aqueous medium and, thus, it is necessary to operate at temperatures of less than 100° C. in order to ensure the stability of these emulsions or suspensions.

The temperature can, certainly, be lowered, but the presence of Lewis acids is then necessary and this involves operating in an anhydrous medium.

It is also necessary for the catalyst not to be degraded by water under normal polymerization conditions. For better control of the polymerization, it is, in addition, preferable to operate in a homogeneous medium (that is to say, with a catalyst which remains soluble in the organic medium).

SUMMARY OF THE INVENTION

The aim of the present invention consequently consists in overcoming the abovementioned disadvantages and in carrying out radical polymerizations which make possible control identical to ionic and coordination polymerizations under synthetic conditions which are acceptable industrially and which, consequently, make it possible to synthesize pure sequential or statistical copolymers and homopolymers of predetermined length.

Generally, the aim of the invention is to present a process for the radical polymerization or copolymerization of (meth) acrylic and/or vinyl monomers which makes it possible to control the growth of the polymer chains, the polymerization process being carried out in bulk, solution, emulsion or suspension until all the monomer or monomers present have been consumed.

To do this, it is necessary to prevent or at the very least limit the termination reactions by combination and to promote a rapid initiation of the polymerization or copolymerization.

Thus it is that one of the essential aims of the invention is to provide catalysts and initiators which make it possible, without requiring appreciable modification of the conventional technology, to obtain, under industrially and economically acceptable conditions, polymers and copolymers corresponding to the commercial requirements of regioselectivity, stereoselectivity and control of the molecular masses and their distributions.

To this end, provision is made, according to the present invention, for a process for the controlled radical polymerization or copolymerization of (meth)acrylic and/or vinyl monomers in which the bulk, solution, emulsion or suspension polymerization or copolymerization is carried out, at a temperature which can fall to 0° C., of at least one (meth) acrylic and/or vinyl monomer in the presence of an initiating system comprising at least one radical generator and at least one catalyst composed of a metal complex containing a ligand of the type

$$[4\text{-}R^3\text{-}2,6\text{-}(CH_2NR^1R^2)_2C_6H_2]^- \qquad (I)$$

in which:

R$^1$ and R$^2$, which are identical or different, represent a branched or unbranched C$_1$–C$_4$ alkyl group or a phenyl group or alternatively R$^1$ and R$^2$ form, with the nitrogen atom to which they are connected, a cyclic amine or alternatively the two R$^2$ groups, taken together, form a polymethylene bridge, and R$^3$ represents a hydrogen atom, an alkyl or benzyl group or an electron-donating or electron-withdrawing functional group.

The ligand of the polymerization catalyst advantageously corresponds to one of the following general formulae:

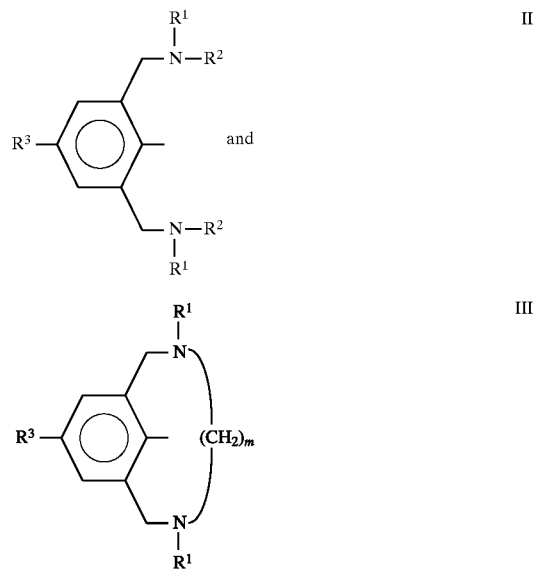

in which:

R$^1$, R$^2$ and R$^3$ are as defined above and, in the formula III, the two amino groups of the ligand are connected by a chain formed from m (7 to 10) methylene units.

According to an advantageous embodiment of the invention, the polymerization catalyst corresponds to one of the following general formulae:

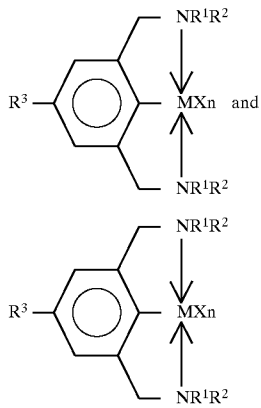

in which:
R$^1$, R$^2$ and R$^3$ are as defined above;
M represents a transition metal element, particularly a metal from group VIII of the Table of the Periodic Classification of the Elements;
X represents a monoatomic or polyatomic anionic group;
n represents an integer equal to 0, 1 or 2, the value of which depends on the oxidation state of the metal M, and
L represents a stabilizing ligand of the Lewis base type, such as a pyridine, phosphine or phosphite group.

In the formulae I to V shown above, R$^1$ and R$^2$ advantageously each represent a group chosen from methyl, ethyl, isopropyl, tert-butyl and phenyl groups or alternatively R$^1$ and R$^2$ form, with the nitrogen atom to which they are connected, a pyrrolidinyl or proline ring or alternatively the two R$^2$ groups, taken together, form a polymethylene bridge;

R$^3$ represents a hydrogen or chlorine atom or a cyano, nitro, primary, secondary or tertiary amino, C$_1$–C$_5$ alkoxy, C$_1$–C$_5$ alkyl, benzyloxy, benzyl, amide, acyl or imine group and the metal M is chosen from the elements Ni, Pd, Pt, Co, Rh, Ir, Fe, Ru and Os.

Some of these catalysts, in particular the nickel complexes, are already known as separate catalysts and have been described in the literature, in particular by G. Van Koten et al. in J. Mol. Catal., 45, p. 169 (1988), J. Chem. Mater., vol. 6, 1675 (1994), Nature, 656, vol. 372 (1994), Recl. Trav. Chim. Pays-Bas, 113, p. 267 (1994) and Organometallics, vol. 13, 468 (1994).

More particularly, in the formulae of the ligands and catalysts I to V, the following substituents are regarded as being highly advantageous:
R$^1$=R$^2$=methyl,
R$^1$=R$^2$=ethyl,
R$^1$=methyl and R$^2$=isopropyl,
R$^1$=methyl and R$^2$=tert-butyl,
R$^1$=methyl and R$^2$=phenyl,
R$^1$=R$^2$=phenyl;

when R$^1$ and R$^2$ form, with the nitrogen atom to which they are connected, a pyrrolidinyl or proline ring, catalysts are obtained which contain asymmetric centres, that is to say chiral centres possessing optical isomers. The transfer of chiral information during the reaction with the monomer to be polymerized can thus induce stereocontrol of the polymerization or copolymerization;

R$^3$ represents, as indicated, a hydrogen or chlorine atom and CN, NO$_2$, NH$_2$, RNH—, RR'N—, RO—, R—, RC(O)NH—, RC(O)— or RR'CN— groups in which the R and R' substituents are methyl, ethyl, propyl, butyl, isopropyl, isobutyl, t-butyl, neopentyl or benzyl groups.

In addition, via R$^3$, R or R', the catalyst can be supported by or grafted onto at least one organic or inorganic group, advantageously silica, a polymer group such as at least one polysilane or one polysiloxane constituting an anchoring point for the catalyst. Thus it is that, by grafting homogeneous catalysts, it is possible to combine the advantages of homogeneous catalysis (high selectivity and mild reaction conditions) with those of heterogeneous catalysis (recycling). By way of examples, the metal catalyst can be grafted onto a dendrimer of the polysilane type or a polymer of the polysiloxane type in the way described by Lucia A. Van de Kuil et al. in Chem. Mater., vol. 6, p. 1675 (1994) and by G. Van Koten et al. in Nature, vol. 372, p. 659 (1994).

The metal M: for n=1, M=Ni$^{II}$, Pd$^{II}$, Pt$^{II}$, Co$^{II}$ or Ru$^{II}$; for n=2, M=Ni$^{III}$ or Fe$^{III}$; when M is, for example, Co$^{II}$ or Ru$^{II}$, the catalyst is preferably stabilized by the ligand L of the pyridine, phosphite or phosphine type (catalyst of formula V).

X: a halogen atom, such as Cl, Br and I, a nitro group, a nitrate group, a conjugate base of a carboxylic acid R$^4$COO$^-$ where R$^4$ represents a hydrogen atom or a C$_1$–C$_{14}$ alkyl, CF$_3$ or CCl$_3$ group (for example, the acetate, formate, propanoate and trifluoroacetate groups) or alternatively an alkanesulphonate group R$^5$SO$_3$— where R$^5$ represents a C$_1$–C$_{14}$ alkyl or CF$_3$ group, an example being the triflate group CF$_3$SO$_3$—.

As the catalyst does not act as radical generator, it is therefore essential to combine it with such a compound. It is assumed that it will interact by transfer of redox atoms or by cycles of oxidative additions followed by reductive insertions and eliminations in order to generate well defined polymer chains. Thus it is that the polymerization will continue if an additional amount of polymerizable monomer is added. A homopolymer is obtained if the monomer is of the same nature, a statistical copolymer in the case of the use of a mixture of different comonomers and a sequential copolymer in the case of the addition of a dose of a different monomer from the first, after the polymerization of the first monomer. The use may be envisaged, for the preparation of sequential copolymers, of a mixture of two or a number of catalysts, the second dose of monomer being added in the presence of a different catalyst but still of the type as defined in the context of the present invention, this catalyst then having to be more active than that already present. Thus it is that this operation can be repeated at each new sequence which it is desired to prepare.

According to the invention, radical-generating compounds which are highly suitable are halogenated compounds activated by electron-donating and/or electron-withdrawing effects on the carbon atom in the position a to the halogen or halogens of the said compound.

When the radical generator is monofunctional, it can be chosen from the classes of halogenated compounds comprising:
a) tri- or tetrahalomethanes of formula: CYZ$_3$ where Y=Cl, Br or H and Z=Cl or Br, for example carbon tetrachloride, chloroform, carbon tetrabromide and bromotrichloromethane;
b) trichloromethylated derivatives of formula: R$^6$CCl$_3$ where R$^6$ represents a phenyl, benzyl, benzoyl, ethoxycarbonyl, acyl, in which the alkyl group has from 1 to 4 carbon atoms, methyl, mesityl, trifluoromethyl or nitro group, such as, for example, α,α,α- trichlorotoluene, α,α,α-trichloroacetophenone, ethyl trichloroacetate, 1,1,1-trichloroethane, 1,1,1-trichloro-2-phenylethane, trichloromethylmesitylene, 1,1,1-trichlorotrifluoroethane and trichloronitromethane;

c) alkyl halides with an electron-withdrawing group on the carbon α to the halogen, of formulae:

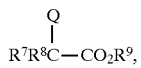
(C1)

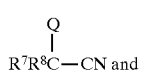
(C2)

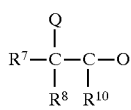
(C3)

where $R^7$, $R^8$ and $R^9$, which are identical or different, each represent a hydrogen atom, a $C_1$–$C_{14}$ alkyl group or an aromatic group, for example of the benzene, anthracene or naphthalene type, $R^{10}$ represents a $C_1$–$C_{14}$ alkyl, phenyl or isocyanate group and Q represents a chlorine or bromine atom or a trifluoroacetate ($OOCCF_3$) or triflate ($O_3SCF_3$) group, such as, for example, 2-bromopropionic acid, 2-bromobutanoic acid, 2-bromohexanoic acid, bromoacetonitrile, 2-bromopropionitrile, 2-bromoisobutyrophenone and chloroacetyl isocyanate;

d) halogenated compounds of formula:

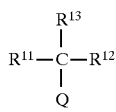

where $R^{11}$ and $R^{12}$, which are identical or different, represent a $C_1$–$C_{14}$ alkyl group or a primary alcohol group —$CH_2OH$, $R^{13}$ is a functional group such as hydroxyl, nitro, substituted or unsubstituted amino, $C_1$–$C_{14}$ alkoxy, acyl, carboxylic acid or ester and Q has the meaning given above, for example 2-bromo-2-nitro-1,3-propanediol and 2-bromo-2-nitropropane;

e) lactone or lactam compounds halogenated at the α position, such as α-bromo-α-methyl-γ-butyrolactone or α-bromo-γ-valerolactone, halogenated lauryllactam or halogenated caprolactam;

f) benzyl halides of formula:

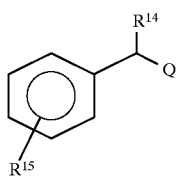

where $R^{14}$ represents a hydrogen atom, a $C_1$–$C_{14}$ alkyl group or a carboxylic acid, ester, nitrile or ketone group, $R^{15}$ represents a hydrogen atom or a $C_1$–$C_{14}$ alkyl, hydroxyl, acyl, substituted or unsubstituted amine, nitro, $C_1$–$C_{14}$ alkoxy or sulphonate ($SO_3$—$Na^+$ or $K^+$) group and Q has the meaning given above;

g) N-halosuccinimides, such as N-bromosuccinimide, and N-halophthalimides, such as N-bromophthalimide;

h) alkanesulphonyl halides of formula $R^{16}SO_2V$ where $R^{16}$ represents a $C_1$–$C_{14}$ alkyl group and V a chlorine or bromine atom.

It is also possible to envisage the use of bifunctional and multifunctional radical generators; the bifunctional radical generators can be composed of two monofunctional radical generators from the abovementioned classes c) to h) connected by a chain of methylene units or by a benzene ring, preferably in the meta position of the latter, as represented by the formulae:

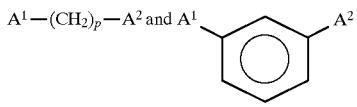

The multifunctional radical-generating compounds can be composed of at least three monofunctional radical-generating groups from the abovementioned classes c) to h) connected to one another by a benzene ring, such as, for example, those corresponding to the formula:

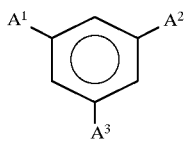

in which formulae $A^1$, $A^2$ and $A^3$ are identical or different and each represent a monofunctional radical-generating group from the abovementioned classes c) to h) and p represents an integer from 1 to 14.

Other bifunctional radical generating compounds are the tri- or tetrahalomethanes and the trichloromethylated derivatives from the abovementioned classes a) and b), it also being possible for the same tri- and tetrahalomethanes to act as multifunctional radical-generating compounds.

Mention will be made, as particularly advantageous radical-generating compounds, of carbon tetrachloride, ethyl trichloroacetate and the ethyl 2-bromo-isobutyrate. Use may also be made, in particular for emulsion polymerization, of sodium trichloroacetate, potassium trichloroacetate, sodium chlorodifluoroacetate, potassium chlorodifluoroacetate and sodium chloroacetate.

Use could also be made of other difunctional radical-generating compounds than those presented above, in particular those of the family of acetic anhydrides, such as the anhydride of chloroacetic acid and the anhydride of chlorodifluoroacetic acid.

Another means for initiating the polymerization consists in initiating the latter using radical initiators commonly used in radical polymerization. Thus, the families of initiators which are usable could be the following:

azo compounds, for example 2,2'-azobisisobutyronitrile (or AIBN), 1,1'-azobis(cyclohexanecarbonitrile) and 4,4'-azobis(4-cyanovaleric acid), peroxide compounds, for example diacyl peroxides, such as dibenzoyl peroxide and didodecanoyl peroxide, dialkyl peroxides, such as di-tert-butyl peroxide and diisopropyl peroxide, diaralkyl peroxides, such as dicumyl peroxide, peroxydicarbonates, peresters, such as tert-butyl peracetate, tert-amyl perpivalate, butyl per-2-ethylhexanoate, tert-butyl perpivalate and tert-butyl perbenzoate, hydroperoxides, such as tert-butyl hydroperoxide, and inorganic peroxides, such as hydrogen peroxide and sodium or potassium persulphates.

As the length of the polymer chains is determined beforehand by the ratio of the (meth)acrylic or vinyl monomer or monomers to the radical-generating compound, the molar proportions of the catalyst to the radical-generating compound and of the monomer or monomers to the catalyst are dominating in the context of the present invention. Thus it is that the molar ratio of the catalyst to the radical-generating compound will be from 0.01 to 100, advantageously from 0.1 to 5, and that the molar ratio of the monomer or monomers to the catalyst will be from 1 to 10,000, advantageously from 50 to 2,000.

The parameter of the polymerization or copolymerization temperature is an extremely important point which distinguishes the process of the invention from the processes using currently known catalytic systems. With the known catalytic processes, the catalyst becomes inactive below a temperature of about 100° C. in the absence of activator. Thus it is that, at 50° C., there is no polymerization with the CuCl/2,2-bipyridine catalyst and, in the absence of activator, with the $RuCl_2(PPh_3)_3$ catalyst, even after several days of reaction. It is possible to speak, in the context of the present invention, of mild reaction conditions because it is rare for catalysts, in synthesis, to remain active at temperatures which can fall to 0° C. at atmospheric pressure. This advantage is extremely important, all the more so since stereocontrol of the polymerization or copolymerization reaction is promoted by a fall in the temperature. Moreover, the bulk reaction conditions (that is to say in the pure monomer or monomers) and the solution, emulsion or suspension reaction conditions are generally identical. The temperature and all the molar ratios can be the same, whatever the reaction process used. The possibility of operating, without risk, in the pure monomer constitutes, of course, an improvement with respect to conventional radical polymerizations. As the concentration of active centres is constant throughout the polymerization or copolymerization reaction due to the absence of termination reactions, the large and sudden exotherm (or Trommsdorf effect) of conventional radical polymerizations does not take place. This, of course, constitutes a significant advance for the industrial process, since there is no longer a risk of polymerizations or copolymerizations carried out under these conditions becoming explosive. Generally, the polymerization or copolymerization will be carried out at a temperature of 0° C. to 150° C., advantageously between 50° and 110° C., without any loss in activity of the catalyst.

As the initiating systems according to the invention are compatible with water, it will therefore be possible to carry out the polymerization or copolymerization reactions in aqueous medium, optionally in the presence of emulsifiers. Thus it is that the polymerizations in aqueous medium are carried out either in suspension (water-insoluble radical-generating compound) or in emulsion (water-soluble radical-generating compound) in the presence of emulsifiers. The emulsifiers can be anionic surfactants, such as sodium dodecylbenzenesulphonate, sodium dodecyl sulphate, sodium lauryl sulphate and their mixtures, or surfactants of the neutral type, such as glycol esters, esters of sorbitan and of polyethylene glycol, such as polyethylene glycol sorbitan monolaurate, monopalmitate, oleate and stearate, esters of fatty acids and of polyethylene glycol, such as polyethylene glycol stearate, and ethers of fatty alcohol and of polyethylene glycol, such as polyethylene glycol stearyl and cetyl ethers.

The anionic emulsifiers must be used above a pH of 7, in order not to modify the structure of the catalyst and consequently to deactivate the latter.

The polymerization or copolymerization reactions of the invention, when they are carried out in solution, can, of course, also be carried out in the presence of an organic solvent or of a mixture of organic solvents belonging to the following families of solvents:

aromatic hydrocarbons (aprotic nonpolar): benzene, toluene, ethylbenzene or xylene;

chlorinated hydrocarbons (aprotic polar): methylene chloride or chlorobenzene;

cyclic ethers (aprotic polar): tetrahydrofuran or dioxane;

esters (polar): ethyl acetate or cyclohexyl acetate;

ketones (polar): methyl ethyl ketone or cyclohexanone.

The abovementioned organic solvents are particularly well suited when the monomers to be polymerized or copolymerized are acrylic (methacrylates, acrylates or acrylonitrile) monomers and vinylaromatic monomers, such as styrene monomers.

In certain cases, in particular in the polymerization of n-butyl methacrylate and styrene, hexane and cyclohexane can be used and, in the polymerization of vinyl acetate and acrylonitrile, dimethylformamide, dimethyl sulphoxide, acetonitrile or acetone can be used.

According to the invention, the polymerization or copolymerization reaction can also be carried out in the presence of a polar additive or of a mixture of polar additives. The presence of these polar additives can be regarded as being advantageous since it makes it possible to modulate the molecular parameters and more precisely to reduce the distribution of the molecular masses and to approach isomolecularity ($\overline{Mw}/\overline{Mn}=1$). Non-limiting examples of polar additives are acetonitrile ($CH_3CN$), water, pyridine, tetrahydrofuran, diethyl ether, dimethyl sulphoxide and acetone. In all cases, these polar additives are present in the form of traces; thus it is that the presence of water as polar additive is not incompatible with an organic solvent. Generally, the polar additive/catalyst molar ratio is from 0 to 100 and advantageously from 0 to 40.

The polymerization and copolymerization process according to the invention generally takes place in an identical way for homopolymerization and statistical copolymerization. For the preparation of sequential copolymers, the experimental conditions can change at the time of the addition of a different monomer from the first, after the polymerization of the first monomer. For example, the temperature can be varied in one direction or the other, it being possible for the second dose to be added with a solvent. For the preparation of macromonomers or of α,ω-functionalized polymers (telechelic polymers), the same type of variation in experimental conditions could be envisaged.

Mention may be made, as monomers which are polymerizable and copolymerizable in the presence of the polymerization or copolymerization initiating system provided, of (meth)acrylic monomers and vinyl monomers (vinylaromatic monomers or vinyl ester monomers, such as vinyl acetate).

The initiating system according to the invention is also suitable for the (co)polymerization of optionally fluorinated olefinic monomers, such as ethylene, butene, hexene or 1-octene. It is also suitable for the (co)polymerization of monomers containing conjugated double bonds, such as butadiene or isoprene.

Acrylic monomer within the meaning of the present invention is understood to mean a monomer chosen from primary, secondary or tertiary alkyl acrylates in which the alkyl group, if appropriate substituted, for example by at least one halogen atom, such as fluorine, and/or at least one hydroxyl group, contains 1 to 18 carbon atoms, mention being made more particularly of ethyl acrylate, propyl acrylate, isopropyl acrylate, butyl acrylate, isobutyl acrylate, hexyl acrylate, tert-butyl acrylate, 2-ethylhexyl acrylate, nonyl acrylate, lauryl acrylate, stearyl acrylate, cyclohexyl acrylate and isodecyl acrylate, as well as phenyl acrylate, isobornyl acrylate, alkylthioalkyl or alkoxyalkyl acrylates, acrylonitrile and dialkylacrylamides.

Methacrylic monomer within the meaning of the present invention is understood to mean a monomer chosen from alkyl methacrylates in which the alkyl radical, if appropriate substituted, for example by at least one halogen atom such as fluorine and/or at least one hydroxyl group, contains 1 to 18 carbon atoms, such as methyl, ethyl, 2,2,2-trifluoroethyl, n-propyl, isopropyl, n-butyl, sec-butyl, tert-butyl, n-amyl, isoamyl, hexyl, 2-ethylhexyl, cyclohexyl, octyl, isooctyl, decyl, β-hydroxyethyl, hydroxypropyl and hydroxybutyl methacrylates, as well as glycidyl methacrylate, norbornyl methacrylate, methacrylonitrile and dialkylmethacrylamides.

Vinylaromatic monomer within the meaning of the present invention is understood to mean an aromatic monomer containing ethylenic unsaturation, such as styrene, vinyltoluene, α-methylstyrene, 4-methylstyrene, 3-methylstyrene, 4-methoxystyrene, 2-(hydroxymethyl) styrene, 4-ethylstyrene, 4-ethoxystyrene, 3,4-dimethylstyrene, 2-chlorostyrene, 3-chlorostyrene, 4-chloro-3-methylstyrene, 3-tertbutylstyrene, 2,4-dichlorostyrene, 2,6-dichlorostyrene and 1-vinylnaphthalene.

According to the invention, it has been found that, by a judicious combination, as catalyst, of a metal complex containing a ligand as defined above and of a polymerization radical-generating compound, it is possible to succeed in obtaining completely defined and controlled homopolymers and sequential and statistical copolymers, as well as macromonomers and α,ω-functionalized polymers (telechelic polymers), which until now could not be synthesized with conventional radical polymerization processes.

The invention thus also relates to the polymers or copolymers as obtained by the abovementioned process with controlled molecular masses and with narrow polydispersity.

The polymers and copolymers of (meth)acrylic or vinyl monomers as obtained by the process of the invention exhibit molecular masses $\overline{Mn}$ of between 400 and 1,000,000 g/mol and a particularly narrow polydispersity $\overline{Mw}/\overline{Mn}$ of less than 2 and preferably less than 1.5. In the context of the radical polymerization, this is an important advance since, only a short time ago, it was unthinkable to obtain molecular mass distributions or polydispersities $\overline{Mw}/\overline{Mn}$ of less that 1.5. Moreover, the process of the invention is extremely regioselective, that is to say that it allows excellent control over the orientation of the monomeric units during propagation. Moreover, the linkages are oriented exclusively head to tail and no longer head to head, as could be the case in conventional radical polymerization. This promotes the thermostability of the polymers and copolymers thus prepared. The absence of termination reactions eliminates any other possibility of head to head linkage.

In comparison with known radical and ionic polymerization and copolymerization processes, the process of the present invention exhibits the following advantages:

excellent molecular control: narrow $\overline{Mw}/\overline{Mn}$ up to approximately $\overline{Mw}/\overline{Mn}=1.1$; good correlation between the theoretical $\overline{Mn}$ and the experimental $\overline{Mn}$ as a function of the radical generator; possibility of preparation of sequential copolymers;

homogeneous polymerization medium;

mild temperature conditions ranging from 0° C. to 150° C.;

compatibility in aqueous medium because the catalysts used do not degrade in the presence of water.

Possibility of emulsion and suspension polymerization;

possibility of stereocontrol, that is to say of the control of the hetero-, syndio- or isotacticity. For this, use may be made of catalysts with amino groups which are hindered or connected to one another by methylene linkages (obstruction of a face of the catalyst), as well as of chiral catalysts;

excellent control of the synthesis of the polymers or copolymers obtained, the molecular masses of which vary between 400 and 1,000,000 g/mol and more particularly between 4000 and 130,000 g/mol;

the resistance to thermal degradation of the polymers and copolymers is improved due to the absence of termination reactions (combinations and disproportionations), which can be shown in particular by thermogravimetric analysis;

preparation of new products which are difficult to access by conventional polymerization techniques, such as pure sequential copolymers, defined statistical copolymers and highly branched polymers which can be used as controlled formulation adhesives, impact-resistant additives, emulsifying agents or interfacial agents.

Ideally, in a living polymerization, all the monomer is consumed and the yield is thus 100% (quantitative) but it may be less for various reasons and more particularly:

kinetics (slow reaction);

viscosity, which prevents the diffusion of the monomer and growing polymer chains.

This explanation relates to the majority of the examples in which the yield varies from 80 to 90%. In fact, the reaction mixture rapidly vitrifies due to the properties of the polymers obtained (the glass transition temperature being greater than the polymerization temperature).

In general, the yield can also be less than 100% as a result of the presence of termination reactions; however, this is not the case in the context of the process of the present invention since these reactions do not exist or at least since they cannot be detected experimentally.

Non-limiting examples describing the preparation of polymers and copolymers as obtained according to the process of the present invention are given below.

EXAMPLE 1

Polymerization of methyl methacrylate 1.87 g of methyl methacrylate are added to 33 mg ($10^{-4}$ mol) of catalyst [Ni{2,6-[CH$_2$N(CH$_3$)$_2$]$_2$-C$_6$H$_3$}Br] under an inert atmosphere. 11 mg ($7.2\times10^{-5}$ mol) of carbon tetrachloride in solution in 0.34 g of toluene are injected into the tube which contains the catalyst and the monomer. The tube is sealed after degassing and then placed in an oil bath at a temperature of the order of 76° to 78° C. The polymerization lasts 19 hours. The polymer is recovered by precipitating from methanol and then analysed.

A yield of 84% of polymer is obtained.

$\overline{Mn}_{exp}=32,100$ g/mol (poly(methyl methacrylate) standard).

$\overline{Mn}_{theo}=28,800$ g/mol.

$\overline{Mw}/\overline{Mn}=1.28$.

These last values are obtained in the following way. Steric exclusion chromatography (SEC) is carried out, which makes it possible to separate the PMMA (poly(methyl methacrylate)) macromolecules according to their size in solution (hydrodynamic volume). They are then eluted with a solvent (THF mobile phase) for poly(methyl methacrylate). The largest molecules leave first and the smallest molecules last, due to the longer journey in the pores of the column (stationary phase). PMMAs or polystyrene of known absolute masses (determined by another technique) are also injected (standards) and make it possible to obtain a calibration curve from which are determined the relative molecular masses ($\overline{Mn}_{exp}$) of the polymer whose size and mass distribution or polydispersity ($\overline{Mw}/\overline{Mn}$) it is desired to know.

EXAMPLE 2

Polymerization of methyl methacrylate

The polymerization is carried out as in Example 1, with the exception that acetonitrile is added, as polar additive, to the mother solution (that is to say, monomer, solvent and catalyst).

[Ni{2,6-[CH$_2$N(CH$_3$)$_2$]$_2$C$_6$H$_3$}Br]=33 mg ($10^{-4}$ mol),
Methyl methacrylate=1.87 g,
CCl$_4$=11 mg ($7.2\times10^{-5}$ mol),
Toluene=0.34 g
CH$_3$CN=78.6 mg ($1.9\times10^{-3}$ mol),
Duration of polymerization=19 h,
Temperature of the oil bath=76°–78° C.,
$\overline{Mn}_{exp}$=19,000 g/mol (PMMA standard); $\overline{Mn}_{theo}$=20,500 g/mol;
Yield=79%; $\overline{Mw}/\overline{Mn}$=1.19.

EXAMPLE 3

Polymerization of ethyl methacrylate

The polymerization is carried out as in Example 2.
[Ni{2,6-[CH$_2$N(CH$_3$)$_2$]$_2$C$_6$H$_3$}Br]=33 mg ($10^{-4}$ mol),
Ethyl methacrylate=0.92 g,
CCl$_4$=3 mg ($2\times10^{-5}$ mol),
CH$_3$CN=0.8 mg ($2\times10^{-5}$ mol),
Toluene=0.17 g
Duration of polymerization=37.5 h,
Temperature of the oil bath=76°–78° C.,
$\overline{Mn}_{exp}$=21,400 g/mol (PMMA standard);
$\overline{Mn}_{theo}$=41,500 g/mol;
Yield=90%; $\overline{Mw}/\overline{Mn}$=1.14.

EXAMPLE 4

Polymerization of methyl methacrylate

The polymerization is carried out in as in Example 2.
[Ni{2,6-[CH$_2$N(CH$_3$)$_2$]$_2$C$_6$H$_3$}Br]=33 mg ($10^{-4}$ mol),
Methyl methacrylate =1.87 g,
CCl$_4$=11 mg ($7.2\times10^{-5}$ mol),
Toluene=0.34 g
CH$_3$CN=78.6 mg ($1.9\times10^{-3}$ mol),
Duration of polymerization=216 h,
Temperature of the oil bath=50° C.,
$\overline{Mn}_{exp}$=9,300 g/mol (PMMA standard); $\overline{Mn}_{theo}$=9,400 g/mol;
Yield =36%; $\overline{Mw}/\overline{Mn}$=1.14.

EXAMPLE 5

Polymerization of n-butyl methacrylate

The polymerization is carried out as in Example 2.
[Ni{2,6-[CH$_2$N(CH$_3$)$_2$]$_2$C$_6$H$_3$}Br]=33 mg ($10^{-4}$ mol),
n-Butyl methacrylate=1.78 g,
CCl$_4$=11 mg ($7.2\times10^{-5}$ mol),
Toluene=0.34 g
CH$_3$CN =0.16 g ($3.8\times10^{-3}$ mol),
Duration of polymerization=76 h,
Temperature of the oil bath=76°–78° C.,
$\overline{Mn}_{exp}$=11,900 g/mol (PMMA standard);
$\overline{Mn}_{theo}$=22,800 g/mol;
Yield=92%; $\overline{Mw}/\overline{Mn}$=1.15.

EXAMPLE 6

Statistical copolymerization of methyl methacrylate/ethyl methacrylate

The polymerization is carried out as in Example 2 but starting with a mixture of methacrylates.

[Ni{2,6-[CH$_2$N(CH$_3$)$_2$]$_2$C$_6$H$_3$}Br]=33 mg ($10^{-4}$ mol),
Methyl methacrylate=0.94 g,
Ethyl methacrylate=1 g
CCl$_4$=11 mg ($7.2\times10^{-5}$ mol),
Toluene=0.34 g
CH$_3$CN =0.16 g ($3.8\times10^{-3}$ mol),
Duration of polymerization=68 h,
Temperature of the oil bath=76°–78° C.,
$\overline{Mn}_{exp}$=13,400 g/mol (PMMA standard); $\overline{Mn}_{theo}$=24,400 g/mol;
Yield =90%; $\overline{Mw}/\overline{Mn}$=1.14.

EXAMPLE 7

Polymerization of styrene

The polymerization is carried out as in Example 1.
[Ni{2,6-[CH$_2$N(CH$_3$)$_2$]$_2$C$_6$H$_3$}Br]=21.8 mg ($6.62\times10^{-5}$ mol),
Styrene=0.54 g,
CCl$_4$=7.69 mg ($4.99\times10^{-5}$ mol),
THF=0.62 g
Duration of polymerization=42 h,
Temperature of the oil bath=70° C. for 21 h, then 110° C. for 21 h.
Yield=92%;
$\overline{Mn}_{exp}$=18,200 g/mol; $\overline{Mn}_{theo}$=10,000 g/mol;
$\overline{Mw}/\overline{Mn}$=1.68.

EXAMPLE 8

Polymerization of methyl methacrylate

The polymerization is carried out as in Example 2.
[Ni{2,6-[CH$_2$N(CH$_3$)$_2$]$_2$C$_6$H$_3$}Br]=33 mg ($10^{-4}$ mol),
Methyl methacrylate=1.87 g,
(CH$_3$)$_2$C(Br)CO$_2$ethyl=14.78 mg ($7.56\times10^{-5}$ mol),
Toluene=0.4 ml
CH$_3$CN=78.6 mg ($1.9\times10^{-3}$ mol),
Duration of polymerization=23 h,
Temperature of the oil bath=80° C.,
$\overline{Mn}_{exp}$=21,400 g/mol (polystyrene standard);
$\overline{Mn}_{theo}$=17,500 g/mol; yield=67%;
$\overline{Mw}/\overline{Mn}$=1.11.

EXAMPLE 9

Polymerization of methyl methacrylate

The polymerization is carried out as in Example 1.
[Ni{2,6-[CH$_2$N(CH$_3$)$_2$]$_2$C$_6$H$_3$}Br]=33 mg ($10^{-4}$ mol), Methyl methacrylate=1.87 g,
(CH$_3$)$_2$C(Br)CO$_2$ethyl=14.78 mg (7.56×10$^{-5}$ mol),
Toluene=0.4 ml
Duration of polymerization=24 h,
Temperature of the oil bath=80°–82° C.,
$\overline{Mn}_{exp}$=21,900 g/mol (polystyrene standard);
$\overline{Mn}_{theo}$=18,200 g/mol; yield =70%;
$\overline{Mw}/\overline{Mn}$=1.11.

EXAMPLE 10

Polymerization of methyl methacrylate

The polymerization is carried out as in Example 1.
[Ni{2,6-[CH$_2$N(CH$_3$)$_2$]$_2$C$_6$H$_3$}Br]=47 mg (1.42×10$^{-4}$ mol),
Methyl methacrylate=5.61 g,
(CH$_3$)$_2$C(Br)CO$_2$ethyl=7 mg (3.6×10$^{-5}$ mol),
Toluene=0.2 ml
Duration of polymerization=43 h,
Temperature of the oil bath=80° C.,
$\overline{Mn}_{exp}$=117,600 g/mol (polystyrene standard);
$\overline{Mn}_{theo}$=136,000 g/mol; yield=87%;
$\overline{Mw}/\overline{Mn}$=1.61.

EXAMPLE 11

Polymerization of methyl methacrylate

The polymerization is carried out as in Example 1.
[Ni{4-CH$_3$O-2,6 -[CH$_2$N(CH$_3$)$_2$]$_2$C$_6$H$_2$}Br]=36 mg (10$^{-4}$ mol),
Methyl methacrylate=1.87 g,
(CH$_3$)$_2$C(Br)CO$_2$ethyl=23.4 mg (1.19×10$^{-4}$ mol),
Toluene=0.26 g
Duration of polymerization=23 h,
Temperature of the oil bath=80° C.,
$\overline{Mn}_{exp}$=14,700 g/mol (polystyrene standard);
$\overline{Mn}_{theo}$=10,300 g/mol; yield=66%;
$\overline{Mw}/\overline{Mn}$=1.09.

EXAMPLE 12

Polymerization of methyl methacrylate

The polymerization is carried out as in Example 1.
[Ni{2,6-[CH$_2$N(CH$_3$)$_2$]$_2$C$_6$H$_3$}Br]=6.6 mg (2×10$^{-5}$ mol),
Methyl methacrylate=1.87 g,
(CH$_3$)$_2$C(Br)CO$_2$ethyl=39 mg (1.99×10$^{-4}$ mol),
Toluene=0.5 ml
Duration of polymerization=22.5 h,
Temperature of the oil bath=80° C.,
$\overline{Mn}_{exp}$=8,500 g/mol (polystyrene standard);
$\overline{Mn}_{theo}$=4,900 g/mol; yield=52%;
$\overline{Mw}/\overline{Mn}$=1.16.

EXAMPLE 13

Polymerization of methyl methacrylate

The polymerization is carried out as in Example 1.
[Ni{2,6-[CH$_2$N(CH$_3$)$_2$]$_2$C$_6$H$_3$}Cl]=28.5 mg (10$^{-4}$ mol),
Methyl methacrylate=1.87 g,
(CH$_3$)$_2$C(Br)Co$_2$ethyl=23.4 mg (1.19×10$^{-4}$ mol),
Toluene=0.26 g
Duration of polymerization=23 h,
Temperature of the oil bath=80° C.,
$\overline{Mn}_{exp}$=12,900 g/mol (polystyrene standard);
$\overline{Mn}_{theo}$=10,700 g/mol; yield=68%;
$\overline{Mw}/\overline{Mn}$=1.11.

EXAMPLE 14

Polymerization of methyl methacrylate

The polymerization is carried out as in Example 2.
[Ni{2,6-[CH$_2$N(CH$_3$)$_2$]$_2$C$_6$H$_3$}Br]=33 mg (10$^{-4}$ mol),
Methyl methacrylate=1.87 g,
(CH$_3$CN)=78 mg,
(Eto(CO)CCl$_3$)=7.65 mg (4×10$^{-5}$ mol),
Toluene=0.4 ml
Duration of polymerization=26 h,
Temperature of the oil bath=80° C.,
$\overline{Mn}_{exp}$=19,500 g/mol,
$\overline{Mn}_{theo}$=27,250 g/mol; yield=58%;
$\overline{Mw}/\overline{Mn}$=1.14 (PMMA standard).

EXAMPLE 15

Polymerization of methyl methacrylate

The polymerization is carried out as in Example 1.
[Ni{2,6-[CH$_2$N(CH$_3$)$_2$]$_2$C$_6$H$_3$}Br]=33 mg (10$^{-4}$ mol),
Methyl methacrylate=1.87 g,
[(CH$_3$)$_2$C(COC$_6$H$_5$)Br] (Isobutyrophenone bromide)= 18.53 mg,
Duration of polymerization=15 h,
Temperature of the oil bath=80° C.,
$\overline{Mn}_{exp}$=12,250 g/mol,
$\overline{Mn}_{theo}$=28,400 g/mol; yield=54%;
$\overline{Mw}/\overline{Mn}$=1.1 (PMMA standard).

EXAMPLE 16

Polymerization of methyl methacrylate

The polymerization is carried out as in Example 1.
[Ni{2,6-[CH$_2$N(CH$_3$)$_2$]$_2$C$_6$H$_3$}Br]=0.34 g (10$^{-3}$ mol),
Methyl methacrylate=1.87 g,
(CH$_3$)$_2$C(Br)CO$_2$ethyl=172 mg,
Toluene=1 ml,
Duration of polymerization=19 h,
Temperature of the oil bath=60° C.,
$\overline{Mn}_{exp}$=3,600 g/mol,
$\overline{Mn}_{theo}$=2,100 g/mol; yield=95%;
$\overline{Mw}/\overline{Mn}$=1.2 (PMMA standard).

EXAMPLE 17

Polymerization of methyl methacrylate

The polymerization is carried out as in Example 1.
[Ni{2,6-[CH$_2$N(CH$_3$)$_2$]$_2$C$_6$H$_3$}Br]=0.34 g (10$^{-3}$ mol),
Methyl methacrylate=1.87 g,
CCl$_4$=0.144 g,
Toluene=1 ml, Duration of polymerization=19 h,
Temperature of the oil bath=60° C.,
$\overline{Mn}_{exp}$=1,250 g/mol,
$\overline{Mn}_{theo}$=1,980 g/mol; yield=100%;
$\overline{Mw}/\overline{Mn}$=1.2 (PMMA standard).

EXAMPLE 18

Bulk polymerization of methyl methacrylate

The polymerization is carried out as in Example 1 but without toluene.
[Ni{2,6-[CH$_2$N(CH$_3$)$_2$]$_2$C$_6$H$_3$}Br]=29 mg (8.79×10$^{-2}$ mol),
Methyl methacrylate=4.58 g,
(CH$_3$)$_2$C(Br)CO$_2$ethyl=7.64 mg (3.92×10$^{-5}$ mol),
Duration of polymerization=43 h,
Temperature of the oil bath=80° C.

EXAMPLE 19

Polymerization of methyl methacrylate in dilute medium

The polymerization is carried out as in Example 1.
[Ni{2,6-[CH$_2$N(CH$_3$)$_2$]$_2$C$_6$H$_3$}Br]=29 mg (8.79×10$^{-2}$ mol),
Methyl methacrylate=4.58 g,
(CH$_3$)$_2$C(Br)CO$_2$ethyl=7.64 mg (3.92×10$^{-5}$ mol),
Toluene: 5 ml,
Duration of polymerization=43 h,
Temperature of the oil bath=80° C.

Table of results (PMMA standard)

| Example | Yds (%) | $\overline{Mn}_{theo}$ (g/mol) | $\overline{Mn}_{exp}$ (g/mol) | $\overline{Mw}/\overline{Mn}$ |
|---|---|---|---|---|
| 18 | 77 | 89,800 | 97,900 | 1.64 |
| 19 | 50 | 58,900 | 64,800 | 1.16 |

EXAMPLE 20

Bulk polymerization of methyl methacrylate at 20° C. in the presence of CH$_3$CN The polymerization is carried out as in Example 2.
[Ni{2,6-[CH$_2$N(CH$_3$)$_2$]$_2$C$_6$H$_3$}Br]=32 mg (9.7×10$^{-5}$ mol),
Methyl methacrylate=1.68 g,
CH$_3$CN=79 mg (1.9×10$^{-3}$ mol),
(CH$_3$)$_2$C(Br)CO$_2$ethyl=15.7 mg (8×10$^{-5}$ mol),
Duration of polymerization=79 h,
Temperature of the oil bath=20° C.,
$\overline{Mn}_{exp}$=12,700 g/mol,
$\overline{Mn}_{theo}$=6,200 g/mol; yield=31.4%;
$\overline{Mw}/\overline{Mn}$=1.09 (PMMA standard).

In Examples 21 and 22, poly(methyl methacrylate) is prepared in the absence of CH$_3$CN, at different temperatures:

EXAMPLE 21

The preparation is carried out as in Example 1.
[Ni{2,6-[CH$_2$N(CH$_3$)$_2$]$_2$C$_6$H$_3$}Br]=38 mg (1.15×10$^{-5}$ mol),
Methyl methacrylate=1.87 g,
(CH$_3$)$_2$C(Br)CO$_2$ethyl=18.72 mg (9.6×10$^{-5}$ mol).

EXAMPLE 22

The polymerization is carried out as in Example 1.
[Ni{2,6-[CH$_2$N(CH$_3$)$_2$]$_2$C$_6$H$_3$}Br]=38 mg (1.15×10$^{-5}$ mol),
Methyl methacrylate=1.87 g,
(CH$_3$)$_2$C(Br)CO$_2$ethyl=18.72 mg (9.6×10$^{-5}$ mol).

Table of results (PMMA standard)

| Example | Temp (°C.) | Yds (%) | Time (h) | $\overline{Mn}_{theo}$ (g/mol) | $\overline{Mn}_{exp}$ (g/mol) | $\overline{Mw}/\overline{Mn}$ |
|---|---|---|---|---|---|---|
| 21 | 60 | 30 | 7 | 5,850 | 7,400 | 1.28 |
| 22 | 80 | 38.5 | 5 | 7,500 | 11,100 | 1.18 |

It may be noted that the increase in temperature makes it possible to improve the yield and the polydispersity is lower at higher temperature.

EXAMPLE 23

The polymerization is carried out as in Example 1 but under bulk conditions.
[Ni{2,6-[CH$_2$N(CH$_3$)$_2$]$_2$C$_6$H$_3$}Br]=1.48 mg (4.48×10$^{-6}$ mol),
Methyl methacrylate=0.88 g,
(CH$_3$)$_2$C(Br)CO$_2$ethyl=8.9 mg (4.56×–5 mol).
Temperature of the oil bath=70° C.

EXAMPLE 24

The polymerization is carried out as in Example 23.
[Ni{2,6-[CH$_2$N(CH$_3$)$_2$]$_2$C$_6$H$_3$}Br]=28.2 mg (8.54×10$^{-5}$ mol),
Methyl methacrylate=0.84 g,
(CH$_3$)$_2$C(Br)CO$_2$ethyl=8.4 mg (4.3×10$^{-5}$ mol).
Temperature of the oil bath=70° C.

EXAMPLE 25

The polymerization is carried out as in Example 23.
[Ni{2,6-[CH$_2$N(CH$_3$)$_2$]$_2$C$_6$H$_3$}Br]=15.7 mg (4.75×10$^{-5}$ mol),
Methyl methacrylate=1.87 g,
(CH$_3$)$_2$C(Br)CO$_2$ethyl=18.7 mg (9.58×10$^{-5}$ mol).
Temperature of the oil bath=70° C.

Table of results (PMMA standard)

| Example | Time (h) | Yds (%) | $\overline{Mn}_{theo}$ (g/mol) | $\overline{Mn}_{exp}$ (g/mol) | $\overline{Mw}/\overline{Mn}$ |
|---|---|---|---|---|---|
| 23 | 47 | 59 | 11,500 | 13,550 | 1.25 |
| 24 | 3.5 | 43.7 | 8,500 | 10,400 | 1.19 |
| 25 | 4.5 | 25 | 4,870 | 7,500 | 1.23 |

EXAMPLE 26

Bulk polymerization of styrene

The polymerization is carried out as in Example 1 but under bulk conditions.

[Ni{2,6-[CH$_2$N(CH$_3$)$_2$]$_2$C$_6$H$_3$}Br]=43 mg (1.3×10$^{-4}$ mol),
Styrene=0.9 g,
[(C$_6$H$_5$)CH(CH$_3$)Cl]=6.11 mg (4.35×10$^{-5}$ mol),
Duration of polymerization=63 h,
Temperature of the oil bath=90° C.,
$\overline{Mn}_{exp}$=20,600 g/mol,
$\overline{Mn}_{theo}$=13,950 g/mol; yield=67%;
$\overline{Mw}/\overline{Mn}$=1.55 (PS standard).

EXAMPLE 27

Bulk polymerization of n-butyl methacrylate

The polymerization is carried out as in Example 1 but under bulk conditions.
[Ni{2,6-[CH$_2$N(CH$_3$)$_2$]$_2$C$_6$H$_3$}Br]=33.8 mg (10$^{-4}$ mol),
n-Butyl methacrylate=1.78 g,
(CH$_3$)$_2$C(Br)CO$_2$ethyl=17.47 mg (8.95×10$^{-5}$ mol),
Duration of polymerization=5 h,
Temperature of the oil bath=95° C.,
$\overline{Mn}_{exp}$=21,400 g/mol,
$\overline{Mn}_{theo}$=18,500 g/mol; yield=93.2%;
$\overline{Mw}/\overline{Mn}$=1.14 (PMMA standard).

EXAMPLE 28 (Comparative)

The polymerization is carried out as in Example 2 but without using the radical-generating compound (CCl$_4$).
[Ni{2,6-[CH$_2$N(CH$_3$)$_2$]$_2$C$_6$H$_3$}Br]=43.7 mg
Methyl methacrylate=0.936 g,
Toluene=0.4 ml,
CH$_3$CN=1.64 mg (4×10$^{-5}$ mol),
Duration of polymerization=22 h,
Temperature of the oil bath=78° C.,
Yield=15%,
$\overline{Mn}_{exp}$=245,000 g/mol,
$\overline{Mn}_{theo}$=3,500 g/mol;
$\overline{Mw}/\overline{Mn}$=3.12.

EXAMPLE 29 (Comparative)

The polymerization is carried out as in Example 2 but without using a catalyst:
Methyl methacrylate=0.936 g,
CCl$_4$=6.16 mg (4×10$^{-5}$ mol)
CH$_3$CN=1.64 mg (4×10$^{-5}$ mol),
Toluene=0.4 ml
Duration of polymerization=22 h,
Temperature of the oil bath=78° C.,
Yield=0.
Examples 30 to 32 relate to the bulk polymerization of methyl methacrylate in the presence of AIBN.

EXAMPLE 30

The polymerization is carried out as in Example 1 with the following components:
[Ni{2,6-[CH$_2$N(CH$_3$)$_2$]$_2$C$_6$H$_3$}Br]=75.1 mg (1.83×10$^{-4}$ mol),
AIBN=9.1 mg (5.54×10$^{-5}$ mol)
Methyl methacrylate=0.936 g,
Duration of polymerization=45 h,
Temperature of the oil bath=85° C.,
$\overline{Mn}_{exp}$=7,800 g/mol,
$\overline{Mn}_{theo}$=5,650 g/mol; yield=67.3%;
$\overline{Mw}/\overline{Mn}$=1.2 (PMMA standard).

EXAMPLE 31

The polymerization is carried out as in Example 30.
[Ni{2,6-[CH$_2$N(CH$_3$)$_2$]$_2$C$_6$H$_3$}Br]=20.5 mg (5×10$^{-5}$ mol),
AIBN=3.77 mg (2.3×10$^{-5}$ mol)
Methyl methacrylate=0.936 g,
Duration of polymerization=48 h,
Temperature of the oil bath=85° C.,
$\overline{Mn}_{exp}$=27,500 g/mol,
$\overline{Mn}_{theo}$=13,700 g/mol; yield=68%;
$\overline{Mw}/\overline{Mn}$=1.06 (PMMA standard).

EXAMPLE 32

Polymerization of methyl methacrylate in the presence of [Ni{2,6-[CH$_2$N(CH$_3$)$_2$]$_2$C$_6$H$_3$}O$_2$CCF$_3$]

[Ni{2,6-[CH$_2$N(CH$_3$)$_2$]$_2$C$_6$H$_3$}O$_2$CCF$_3$]=0,116 g (3.19×10$^{-4}$ mol)
(CH$_3$)$_2$C(Br)CO$_2$ethyl=51.88 mg (2.65×10$^{-4}$ mol)
Methyl methacrylate=0.56 g
Toluene=1 ml
Duration of polymerization=45 h,
Temperature of the oil bath=80° C.,
$\overline{Mn}_{exp}$=2,600 g/mol,
$\overline{Mn}_{theo}$=2,100 g/mol; yield=100%;
$\overline{Mw}/\overline{Mn}$=1.3 (PMMA standard).

EXAMPLE 33

Bulk polymerization of methyl methacrylate

The polymerization is carried out as in Example 32 but under bulk conditions:
[Ni{2,6-[CH$_2$N(CH$_3$)$_2$]$_2$C$_6$H$_3$}O$_2$CCF$_3$]=0,116 g (3.19×10$^{-4}$ mol)
(CH$_3$)$_2$C(Br)CO$_2$ethyl=17.38 mg (8.91×10$^{-5}$ mol)
Methyl methacrylate=1.49 g
Duration of polymerization=20.5 h,
Temperature of the oil bath=70° C.,

EXAMPLE 34

Bulk polymerization of methyl methacrylate

The polymerization is carried out as in Example 33 but the duration of polymerization is 28 h.

Table of results (PMMA standard)

| Example | Yds (%) | Time (h) | $\overline{Mn}_{theo}$ (g/mol) | $\overline{Mn}_{exp}$ (g/mol) | $\overline{Mw}/\overline{Mn}$ |
|---|---|---|---|---|---|
| 33 | 39 | 20.5 | 7,155 | 13,500 | 1.25 |
| 34 | 48 | 28 | 8,900 | 16,500 | 1.21 |

EXAMPLE 35

Example of resumption with the same monomer:

This example shows that, with the process according to the invention, there are no termination reactions. It thus shows that it is possible to take up monomer again if, after the polymerization of the first sequence, another amount of monomer is introduced.

[Ni{2,6-[CH$_2$N(CH$_3$)$_2$]$_2$C$_6$H$_3$}Br]=43.5 mg
Methyl methacrylate=0.936 g (first dose)
CCl$_4$=6.16 mg (4×10$^{-5}$ mol)
Toluene=0.4 ml
CH$_3$CN=1.64 mg (4×10$^{-5}$ mol)
Duration of polymerization=22 h
Temperature of the oil bath=78° C.
Yield=80%
$\overline{Mn}_{exp}$=12,300 g/mol
$\overline{Mw}/\overline{Mn}$=1.16.

A second dose of monomer is then added and the polymerization is continued:

Methyl methacrylate=0.936 g
Duration of polymerization=23 h
Temperature of the oil bath=78° C.
Yield=85%
$\overline{Mn}_{exp}$ (copolymer)=22,800 g/mol
$\overline{Mw}/\overline{Mn}$=1.25.

EXAMPLE 36

Examples of resumption with methyl methacrylate:
First sequence:
[Ni{2,6-[CH$_2$N(CH$_3$)$_2$]$_2$C$_6$H$_3$}Br]=63 mg (2.2×10$^{-4}$ mol)
Methyl methacrylate=0.936 g
(CH$_3$)$_2$C(Br)CO$_2$ethyl=18.8 mg (9.6×10$^{-5}$ mol)
Toluene=1 ml
Duration of polymerization=45 h
Temperature of the oil bath=80° C.
Yield=94%
$\overline{Mn}_{exp}$=12,250 g/mol
$\overline{Mn}_{theo}$=9,700 g/mol
$\overline{Mw}/\overline{Mn}$=1.09 (PMMA standard)

Second sequence:
Methyl methacrylate=0.936 g
Toluene=1 ml
Duration of polymerization=47 h
Temperature of the oil bath=80° C.
Yield=100%
$\overline{Mn}_{exp}$=27,800 g/mol
$\overline{Mn}_{theo}$=19,400 g/mol
$\overline{Mw}/\overline{Mn}$=1.12 (PMMA standard)

EXAMPLE 37

Example of sequential copolymerization of n-butyl methacrylate and of methyl methacrylate:
First sequence: bulk polymerization
[Ni{2,6-[CH$_2$N(CH$_3$)$_2$]$_2$C$_6$H$_3$}Br]=0.141 g (4.2×10$^{-4}$ mol)
n-Butyl methacrylate=1.78 g
(CH$_3$)$_2$C(Br)CO$_2$ethyl=33.94 mg (1.74×10$^{-4}$ mol)
Duration of polymerization=29 h
Temperature of the oil bath=60° C.
Yield 100%
$\overline{Mn}_{exp}$=11,100 g/mol
$\overline{Mn}_{theo}$=10,300 g/mol
$\overline{Mw}/\overline{Mn}$=1.18 (PS standard)

Second sequence:
Methyl methacrylate=1.87 g
THF =3 ml
Duration of polymerization=42 h
Temperature of the oil bath=60° C.
Yield=70%
$\overline{Mn}_{exp}$=23,200 g/mol
$\overline{Mn}_{theo}$=17,800 g/mol
$\overline{Mw}/\overline{Mn}$=1.15 (PS standard)

The preceding examples can be repeated with similar success by substituting the generically or specifically described reactants and/or operating conditions of this invention for those used in the preceding examples.

With respect to the nomenclature in the preceding description of the invention, the term "molecular mass" is synonymous with "molecular weight". Also, "radical polymerization" is synonymous with "free radical polymerization".

The entire disclosure of all applications, patents and publications, cited above, and of corresponding French application 96/03536, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

We claim:

1. A process for the controlled radical polymerization or copolymerization of (meth)acrylic and/or vinyl monomers, comprising conducting bulk, solution, emulsion or suspension polymerization or copolymerization at a temperature which can fall to 0° C., of at least one of said monomers in the presence of an initiating system comprising a radical-generating compound and at least one catalyst composed of a metal complex containing a ligand of the formula

[4-R$^3$-2,6-(CH$_2$NR$^1$R$^2$)$_2$C$_6$H$_2$]— (I)

in which:

R$^1$ and R$^2$, which are identical or different, represent a branched or unbranched C$^1$–C$^4$ alkyl group or a phenyl group or alternatively R$^1$ and R$^2$ form, with the nitrogen atom to which they are connected, a cyclic amine or alternatively the two R$^2$ groups, taken together, form a polymethylene bridge, R$^3$ represents a hydrogen atom, an alkyl or benzyl group or an electron-donating or electron-withdrawing functional group, and wherein the polymerization or copolymerization reaction is conducted in the presence of at least one polar additive the molar ratio of the polar additive to the catalyst being between 0 and 100, the polymerization being conducted for a sufficient time to obtain polymers or copolymers having a molecular mass $\overline{Mn}$ of between 400 and 1,000,000 g/mol and a polydispersity $\overline{Mw}/\overline{Mn}$ of less than 2.

2. A process according to claim 1, wherein the ligand of the polymerization or copolymerization catalyst corresponds to one of the following general formulae

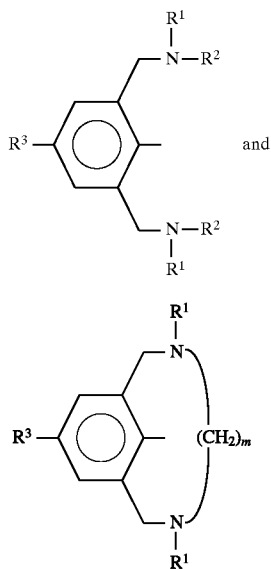

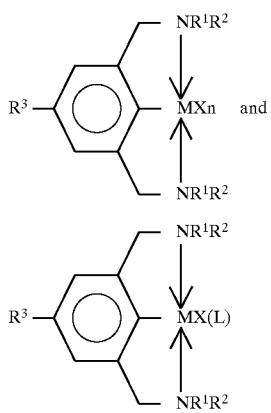

in which:

R$^1$, R$^2$ and R$^3$ are as defined above and m is an integer ranging from 7 to 10.

3. A process according to claim 1, wherein the polymerization catalyst corresponds to one of the following general formulae:

in which:

R$^1$, R$^2$ and R$^3$ are as defined above;

M represents a transition metal element,

X represents a monoatomic or polyatomic anionic group n represents an integer equal to 0, 1 or 2; and L represents a stabilizing Lewis base ligand.

4. A process according to claim 1 wherein, in the formulae I to V,

R$^1$ and R$^2$ each represent methyl, ethyl, isopropyl, tert-butyl or phenyl or alternatively form, with the nitrogen atom to which they are connected, a pyrrolidinyl or proline ring or alternatively the two R$^2$ groups, taken together, form a polymethylene bridge, R$^3$ represents a hydrogen or chlorine atom, a C$_1$–C$_5$ alkyl group, a benzyl group or a cyano, nitro, primary, secondary or tertiary amino, C$_1$–C$_5$ alkoxy, benzyloxy, amide, acyl or imine group.

5. A process according to claim 3, characterized in that the catalyst is supported by or grafted onto at least one organic or inorganic group from the R$^3$ substituent of the ligand.

6. A process according to claim 3, wherein the metal M is Ni$^{II}$, Ni$^{III}$, Pd$^{II}$, Pt$^{II}$, Co$^{II}$, Ru$^{II}$ or Fe$^{III}$.

7. A process according to claim 1, wherein the catalyst is [Ni{2,6-[CH$_2$N(CH$_3$)$_2$]$_2$C$_6$H$_3$}Br], [Ni{2,6-[CH$_2$N(CH$_3$)$_2$]$_2$C$_6$H$_3$}Cl] or [Ni{4-CH$_3$O-2,6-[CH$_2$N(CH$_3$)$_2$]$_2$C$_6$H$_2$}Br].

8. A process according to claim 1, wherein the radical-generating compound is a halogenated compound activated by electron-donating and/or electron-withdrawing effects on the carbon atom in the position α to the halogen or halogens of the said compound.

9. A process according to claim 8, wherein the radical-generating compound is monofunctional and is:

a) a tri- or tetrahalomethane of formula CYZ$_3$ where Y=Cl, Br or H and Z=Cl or Br;

b) a trichloromethylated compound of the formula R$^6$CCl$^3$ where R$^6$ represents a phenyl, benzyl, benzyol, acyl in which the alkyl group is C$_1$–C$_{14}$, ethylOC(O), CH$_3$, mesityl, CF$_3$ or NO$_2$ group; or c) an alkyl halide of the formula:

$$R^7R^8C-CO_2R^9, \quad \text{with } Q \text{ substituent} \tag{C1}$$

$$R^7R^8C-CN \quad \text{and} \quad \text{with } Q \text{ substituent} \tag{C2}$$

$$R^7-\underset{\underset{R^8}{|}}{\overset{\overset{Q}{|}}{C}}-\underset{\underset{R^{10}}{|}}{C}=O \tag{C3}$$

where R$^7$, R$^8$ and R$^9$ each represent a hydrogen atom, a C$_1$–C$_{14}$ alkyl group or an aromatic group, R$^{10}$ is a C$_1$–C$_{14}$ alkyl group or an aromatic group, R$^{10}$ is a C$_1$–C$_{14}$ alkyl, phenyl or isocyanate group and Q represents Cl, Br, OOCCF$_3$ or O$_3$SCF$_3$;

d) an alkyl halide of the formula:

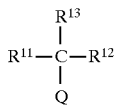

where R$^{11}$ and R$^{12}$, which are identical or different, represent a C$^1$–C$^{14}$ alkyl group or a primary alcohol group —CH$_2$OH and R$^{13}$ a hydroxyl, nitro, substituted or unsubstituted amino, C$_1$–C$_{14}$ alkoxy, acyl, carboxylic acid or ester group and Q has the meaning given above;

e) α-bromo-α-methyl-γ-butyrolactone or α-bromo-γ-valerolactone;

f) a benzyl halide of the formula:

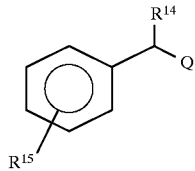

where R$^{14}$ represents a hydrogen atom, a C$^1$–C$^{14}$ alkyl group or a carboxylic acid, ester, nitrile or ketone group, R$^{15}$ represents a hydrogen atom or a C$^1$–C$^{14}$ alkyl, hydroxyl, acyl, amine, nitro, C$^1$–C$^{14}$ alkoxy or sulphonate group and Q has the meaning given above;

g) an N-halosuccinimide or N-halophthalimide; or h) an alkanesulphonyl halide of the formula $R^{16}SO_2V$ where $R^{16}$ represents a $C_1$–$C_{14}$ alkyl group and V a chlorine or brome atom.

10. A process according to claim 8, wherein the radical-generating compound is bifunctional and is composed of two monofunctional radical-generating groups from the abovementioned classes c) to h) connected by a chain of methylene units or by a benzene ring, in the meta position of the latter, of the anhydride of chloroacetic acid, of the anhydride of chlorodifluoroacetic acid or of a tri- or tetra-halomethane or a trichloromethylated derivative as defined respectively in the abovementioned classes a) and b).

11. A process according to claim 8, wherein the radical-generating compound is multifunctional and is composed of at least three monofunctional radical-generating groups from the abovementioned classes c) to h) connected to one another by a benzene ring or of a tri- or tetrahalomethane from the abovementioned class a).

12. A process according to claim 9, wherein the radical-generating compound is carbon tetrachloride, ethyl trichloroacetate or the ethyl 2-bromo-isobutyrate.

13. A process according to claim 8, wherein the radical-generating compound is sodium trichloroacetate, potassium trichloroacetate, sodium chlorodifluoroacetate, potassium chlorodifluoroacetate and sodium chloroacetate.

14. A process according to claim 1, characterized in that the radical-generating compound is dibenzoyl peroxide or 2,2'-azobisisobutyronitrile.

15. A process according to claim 1, wherein the polymerization or copolymerization is conducted at a temperature of 0° C. to 150° C.

16. A process according to claim 1, characterized in that the molar ratio of the catalyst to the radical-generating compound is from 0.01 to 100.

17. A process according to claim 1, characterized in that the molar ratio of the monomer or monomers to the catalyst is from 1 to 10,000.

18. A process according to claim 1, wherein the polar additive/catalyst molar ratio is from 0 to 40.

19. A process according to claim 1, wherein the polymerizable or copolymerizable monomers comprise at least one monomer selected from the group consisting of methacrylates, acrylates, vinylaromatic derivatives and vinyl acetate.

20. A process according to claim 19, wherein the monomer is methyl methacrylate, ethyl methacrylate, n-butyl methacrylate, acrylonitrile and styrene.

21. Polymers or copolymers obtained according to claim 1, having a molecular mass $\overline{Mn}$ of between 400 and 1,000,000 g/mol and a polydispersity $\overline{Mw}/\overline{Mn}$ of less than 2.

22. Sequential copolymers obtained according to claim 1, wherein each sequence has a molecular mass $\overline{Mn}$ of between 400 and 1,000,000 g/mol and a polydispersity $\overline{Mw}/\overline{Mn}$ of less than 2.

23. A process according to claim 3, wherein M is Ni, Pd, Pt, Co, Rh, Ir, Fe, Ru or Os;

X is a halogen atom, a nitro group, a nitrate group, an $R^4COO$— group where $R^4$ represents a hydrogen atom, a $C_1$–$C_{14}$ alkyl, $CF_3$ or $CCl_3$ or an $R^5SO_3$— group where $R^5$ represents a $C_1$–$C_{14}$ alkyl or $CF_3$; and L is a pyridine, phosphine or phosphite group.

24. A process according to claim 5, wherein said catalyst is grafted onto a polysilane or polysiloxane.

25. A process according to claim 15, wherein the polymerization or copolymerization is conducted at 50° to 110° C.

26. A process according to claim 16, wherein the molar ratio is 0.1 to 5.

27. A process according to claim 17, wherein said molar ratio is 50 to 2000.

28. A polymer or copolymer according to claim 21, wherein the polydispersity is less than 1.5.

29. A polymer or copolymer according to claim 22, wherein the polydispersity is less than 1.5.

30. A process according to claim 1, wherein polydispersity is less than 1.5.

31. A process according to claim 1, wherein the molecular mass is at least 4,000 g/mol.

32. A polymer or copolymer according to claim 21, wherein $\overline{Mn}$ is between 4,000 and 130,000.

33. A process according to claim 1, wherein the at least one polar additive is selected from the group consisting of acetonitrile, water, pyridine, tetrahydrofuran, diethyl ether, dimethyl sulphoxide, acetone and their mixtures.

34. A process according to claim 33, wherein the molar ratio of the polar additive to the catalyst is between 0 and 40.

* * * * *